UNITED STATES PATENT OFFICE.

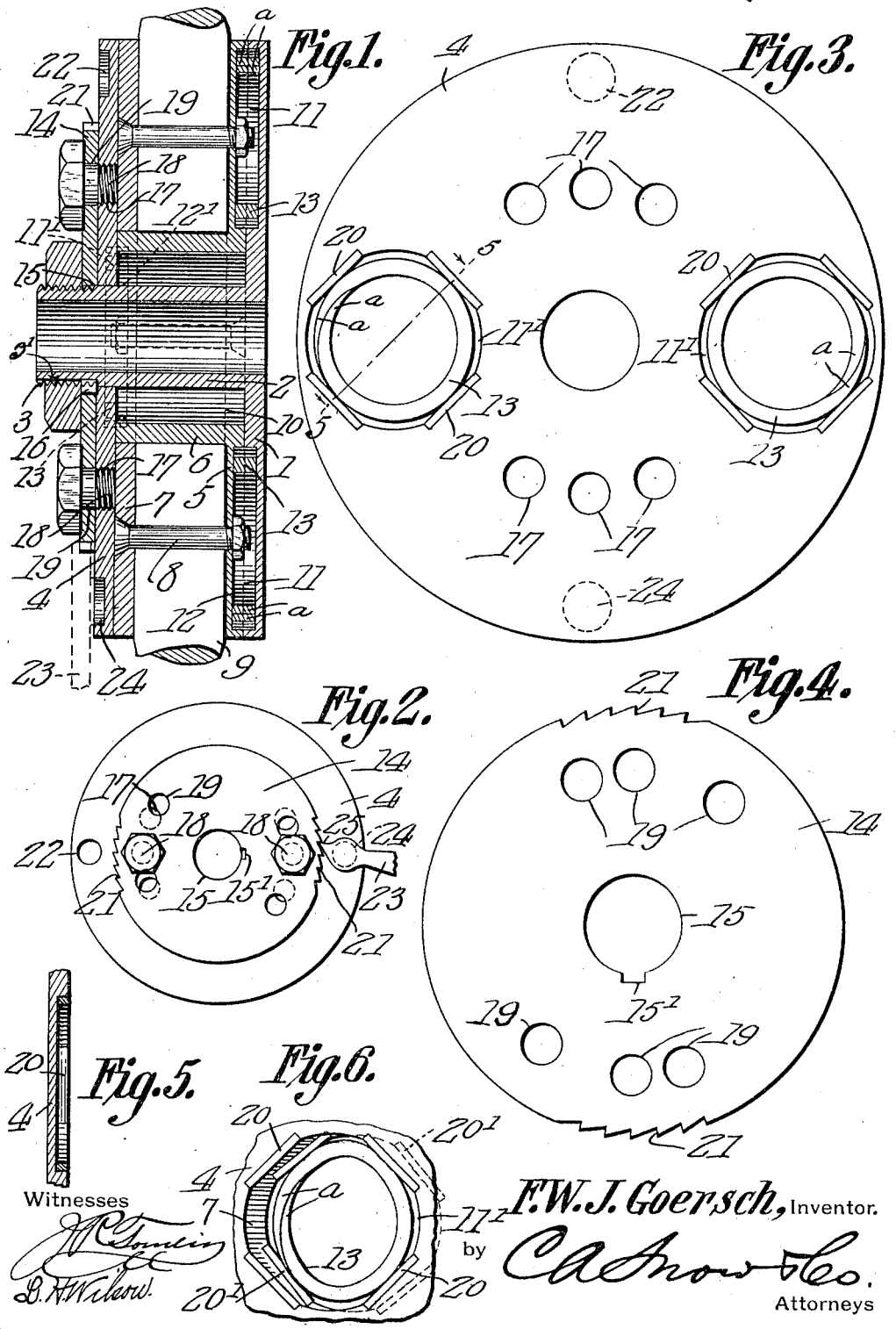

FRIEDRICH WM. J. GOERSCH, OF CLEVELAND, OHIO.

SPRING-WHEEL.

1,066,724.  Specification of Letters Patent.  Patented July 8, 1913.

Application filed June 10, 1912. Serial No. 702,834.

*To all whom it may concern:*

Be it known that I, FRIEDRICH W. J. GOERSCH, subject of the Emperor of Germany, residing at Cleveland, in the county of Cuyahoga and State of Ohio, have invented a new and useful Spring-Wheel, of which the following is a specification.

The present invention relates to improvements in spring wheels, the primary object of the invention being the provision of a novel arrangement of hub and spoke member, the connection between which is composed of a plurality of springs, an auxiliary means being provided for adjusting the tension of said springs to regulate the resiliency of the springs.

A further object of the present invention is the provision of a spring wheel, the main hub member of which constitutes an annular receptacle for the spoke carrying member, said spoke carrying member being permitted a limited movement therewithin, both members being provided with spring carrying portions to provide a resilient connection between the spoke carrying member and the hub member.

A still further object of the invention is the provision of a novel adjusting means to regulate the resiliency of the springs.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a diametrical sectional view through the hub and spoke carrying members of the spring wheel. Fig. 2 is a plan view taken from the side thereof carrying the spring adjusting disk. Fig. 3 is an inner plan view of the removable disk of the hub member. Fig. 4 is an enlarged detail view of the spring adjusting disk. Fig. 5 is an enlarged sectional view taken on the line 5—5 of Fig. 3. Fig. 6 is a diagrammatic view illustrating the action of the spring adjusting lugs and one spring.

Referring to the drawings, the numeral 1 designates the main disk of the hub member which is provided with the concentrically disposed axle engaging sleeve 2, whose outer end is threaded as at 3 and provided with a key way 3′. A disk 4 is slidably mounted upon the sleeve 2 and is made similarly to the disk 1, said disks 1 and 4 providing an annular receptacle for the reception of the spoke carrying member composed of the disk 5, concentric sleeve 6, and annular disk 7, said annular disk 7 being mounted upon and exterior of the end of the sleeve 6, as clearly shown in Fig. 1. The bolts 8 are disposed through the respective disks 5 and 7 and clamp the said disks together to retain the inner ends of the spokes 9 relatively to the spoke carrying member. The sleeve 6 is disposed concentrically of the sleeve 2 of the member 1 and provides the concentric chamber 10 so that the spoke carrying member is permitted a gyratory movement between the disks 1 and 4 and relatively to the sleeve 2.

In order to limit the sliding movement and at the same time resiliently support the spoke carrying member with relation to the disks 1 and 4, the disks 1 and 4 are provided with the circular recesses 11 and 11′ respectively, the recesses 11 upon the disk 1 being disposed diametrically opposite to each other, while the recesses 11′ formed in the disk 4 are diametrically opposite to each other but disposed at 90° angle with relation to the recesses 11 of the disk 1.

Upon the outer face of the respective disks 5 and 7 and disposed to aline with the respective recesses 11—11′ of the disks 1 and 4, are the circular recesses 12 and 12′, respectively, which co-act with the opposed recesses 11 and 11′ of the disks 1 and 4, to provide a receptacle for the lap or open ring springs 13, there being one spring to each receptacle formed by the recesses. The ends *a—a* of the spring are so disposed as to slide one past the other, and as the spring 13 is wide enough to project within the recess of both members 1 and 5 and 4 and 7 respectively, a proper resilient support for the spoke carrying member with relation to the hub member is provided, and therefore the sliding movement of the spoke carrying member relatively to the hub member is limited by the springs 13.

In order to regulate the tension of the respective springs 13 and thus limit to a certain extent the movement of the spoke carrying member, under varying load conditions, the disk 14 is provided, said disk 14 being provided with the central aperture 15 which is disposed to fit upon and over the threaded end 3 of the sleeve 2 exteriorly of the member 4, as clearly shown in Figs. 1 and 2. A key 16 is insertible within the key way 3' and engages the slot 15' of the member 14, and thus locks the member 14 relatively to the sleeve 2, but permits of the necessary movement of the member 4, which as shown is provided with a plurality of threaded apertures 17 for the reception of the adjusting screws 18, said screws being insertible through either one of the respective apertures 19 of the disk 14 to thus lock the disk or member 4 fixedly with relation to the spring adjusting disk 14.

In order that the contact surfaces of the springs relative to the walls of the recesses 11—11' and 12—12' may be reduced, four lugs 20 are carried by the respective disks 1 and 4, while four lugs 20' are carried by the respective disks 5 and 7, the position of the disks 4 with relation to the spoke carrying disk causing the relative position of the recesses 11—11' and 12—12' and the lugs 20 and 20' to change to permit of the contraction or expansion of the springs 13 and consequently the decrease or increase of the resiliency thereof.

In order to readily adjust the springs, the disk 14 is provided with the teeth 21 at diametrically opposite sides thereof in its periphery and said teeth are disposed in the position adjacent to the respective recesses 22 of the hub member 4, so that the actuating lever 23 may have its pivoting stud 24 disposed within one of the recesses 22 with the tooth 25 disposed to engage one of the teeth 21. By this means the disk 14 may be locked with relation to the disk 4, until the respective bolts 18 are removed. After such removal, the bearing downwardly upon the lever 23 will cause the disk 4 to be rotated relatively to the disk 14 or until one of the apertures 17 is placed in line with one of the apertures 19 of the disk 4, at which time the respective bolts 18 are inserted to engage and lock the members relatively together.

What is claimed is:

1. A spring wheel, having a sleeve, a disk fast to one end of the sleeve and another disk rotatably mounted upon the sleeve and in spaced relation to the first disk; a spoke carrying annulus fitting between the first two disks and capable of a gyratory movement relatively to the sleeve; split ring springs mounted in and between the adjacent faces of the first two disks and the spoke carrying annulus to resiliently support the annulus relatively to the sleeve and disks; and means mounted upon the sleeve and connected to the rotatable disk to lock the rotatable disk fast relatively to the first disk.

2. A spring wheel, having a sleeve, a disk fast to one end of the sleeve and another disk rotatably mounted upon the sleeve and in spaced relation to the first disk; a spoke carrying annulus fitting between the first two disks and capable of a gyratory movement relatively to the sleeve; split ring springs mounted in and between the adjacent faces of the first two disks and the spoke carrying annulus to resiliently support the annulus relatively to the sleeve and disks; a disk keyed upon the sleeve exteriorly of the rotatable disk; and co-acting means carried by the keyed disk and rotatable disk to lock the rotatable disk fast to the sleeve.

3. A spring wheel, having a hub provided with a spoke carrying member receptacle, an annular spoke carrying member insertible therein and capable of a gyratory movement relatively to the hub, springs forming a resilient connection between the hub and spoke carrying member, and means for adjusting both members in circumferential relation to vary the resiliency of the springs.

4. A spring wheel, comprising a hub member having a spindle-surrounding skein, and two disks carried thereby and providing an annular chamber therebetween, the inner walls of the disks each having a plurality of recesses; a spoke carrying member fitting slidably in the annular chamber and having a sleeve surrounding and spaced from the skein, and two disks connected to the sleeve and fitting between the disks of the hub, the outer walls of the last disks each having a corresponding number of recesses to aline with the recesses of the adjacent disks of the hub; and a split ring spring disposed in the alined recesses between the hub and spoke carrying disks to resiliently limit the movement of the spoke carrying member relatively to the hub.

5. A spring wheel, having a sleeve, a disk fast to one end of the sleeve and another disk rotatably mounted upon the sleeve and in spaced relation to the first disk, one end of the sleeve projecting beyond and exteriorly of the rotatable disk; a spoke carrying annulus fitting between the first two disks and capable of a gyratory movement relatively to the sleeve, the opposed faces of the first two disks and spoke carrying annulus being provided with a similar number of recesses for registration one with the other; a split ring spring mounted in the alined recesses of the respective disks and spoke carrying annulus to provide a resilient support between the disks and spoke carrying annulus; and means mounted upon the projecting end of the sleeve and connected to the rotatable disk to lock the rotatable disk relatively to the first disk.

6. A spring wheel, having a sleeve, a disk fast to one end of the sleeve and another disk rotatably mounted upon the sleeve and in spaced relation to the first disk, one end of the sleeve projecting beyond and exteriorly of the rotatable disk; a spoke carrying annulus fitting between the first two disks and capable of a gyratory movement relatively to the sleeve, the opposed faces of the first two disks and spoke carrying annulus being provided with a similar number of recesses for registration, one with the other; a split ring spring mounted in the alined recesses of the respective disks and spoke carrying annulus to provide a resilient support between the disks and spoke carrying annulus; a disk keyed upon the projecting end of the sleeve and exteriorly of the rotatable disk; and co-acting means carried by the keyed disk and rotatable disk to lock the rotatable disk fast to the sleeve.

7. A spring wheel, comprising a hub member having a spindle surrounding skein, and two disks carried thereby and providing an annular chamber therebetween, the inner walls of the disks each having a plurality of recesses; a spoke carrying member fitting slidably in the annular chamber and having a sleeve surrounding and spaced from the skein, and two disks connected to the sleeve and fitting between the disks of the hub, the outer walls of the last disks having a corresponding number of recesses to aline with the recesses of the adjacent disks of the hub; a split ring spring disposed in the alined recesses between the hub and spoke carrying disks to resiliently limit the movement of the spoke carrying member relatively to the hub, said disks being provided with diametrically disposed pairs of lugs for engaging the springs, and means for changing the relative circumferential position of the hub carrying disks to the spoke carrying disks to cause the lugs to vary the compression of the springs.

8. A spring wheel, comprising a hub member having a spindle-surrounding skein, and two disks carried thereby and providing an annular chamber therebetween, the inner walls of the disks each having a plurality of recesses; a spoke carrying member fitting slidably in the annular chamber and having a sleeve surrounding and spaced from the skein, and two disks connected to the sleeve and fitting between the disks of the hub, the outer walls of the last disks having a corresponding number of recesses to aline with the recesses of the adjacent disks of the hub; a split ring spring disposed in the alined recesses between the hub and spoke carrying disks to resiliently limit the movement of the spoke carrying member relatively to the hub, said disks being provided with diametrically disposed pairs of lugs for engaging the springs, a disk keyed upon the outer end of the skein exterior of one of the disks of the hub; and co-acting means carried by the disks and hub member to lock the hub to said disks and against independent circumferential movement to regulate the compressibility of the springs.

9. A spring wheel, comprising a hub member having a spindle surrounding skein, and two disks carried thereby and providing an annular chamber therebetween, the inner walls of the disks each having a plurality of recesses; a spoke carrying member fitting slidably in the annular chamber and having a sleeve surrounding and spaced from the skein, and two disks connected to the sleeve and fitting between the disks of the hub, the outer walls of the last disks having a corresponding number of recesses to aline with the recesses of the adjacent disks of the hub; a split ring spring disposed in the alined recesses between the hub and spoke carrying disks to resiliently limit the movement of the spoke carrying member relatively to the hub; said disks being provided with diametrically disposed pairs of lugs for engaging the springs; means for changing the relative circumferential position of the hub disks to the spoke carrying disks to cause the lugs to compress the springs to reduce the resiliency thereof; and co-acting means carried by the disk and the hub for temporarily compressing or releasing the springs during the adjustment thereof.

10. A spring wheel, having a sleeve, a disk fast to one end of the sleeve and another disk rotatably mounted upon the sleeve and in spaced relation to the first disk, the sleeve having a portion projecting beyond the rotatable disk and exteriorly threaded, the threaded portion being provided with a longitudinal key-way; a spoke carrying annulus fitting between the first two disks and capable of a gyratory movement relative to the sleeve; split ring springs mounted in diametrically opposite positions and between the adjacent faces of the first two disks and the spoke carrying annulus to resiliently support the annulus relatively to the sleeve and disks; a disk fitting upon the projecting end of the sleeve exteriorly of the rotatable disk; a key mounted in the key-way and engaging the last disk to secure the same rigidly to the sleeve; co-acting means carried by the keyed disk and the rotatable disk to lock the rotatable disk relatively to the sleeve; and a nut fitted upon the threaded end of the sleeve to lock the keyed disk against longitudinal movement.

In testimony that I claim the foregoing as my own, I have hereto affixed my signature in the presence of two witnesses.

FRIEDRICH WM. J. GOERSCH.

Witnesses:
CHARLES H. HERTH,
FRANK L. KINGSTON.

Copies of this patent may be obtained for five cents each, by addressing the "Commissioner of Patents, Washington, D. C."